United States Patent Office 3,451,920
Patented June 24, 1969

3,451,920
DEWAXING OF MINERAL OILS
Albert N. De Vault and Marvin M. Johnson, Bartlesville, Okla., assignors to Phillips Petroleum Company, a corporation of Delaware
No Drawing. Filed Oct. 14, 1966, Ser. No. 586,635
Int. Cl. C10g *43/12, 43/14;* B01j *2/28*
U.S. Cl. 208—33                                    9 Claims

ABSTRACT OF THE DISCLOSURE

The use of a hydrogenated butadiene-styrene random copolymer dewaxing aid in a solvent dewaxing process.

---

This invention relates to the dewaxing of mineral oils. In one aspect it relates to the use of a hydrogenated butadiene-styrene random copolymer as a wax crystal modifier in a dewaxing process. In another aspect, it relates to improvement of the efficiency of filtration of precipitated wax from an oil by precipitating the wax in the presence of a small amount of a hydrogenated butadiene-styrene random copolymer.

In a conventional process for separating wax from oils, the oil is dissolved in a solvent such as propane or a mixture of solvents at an elevated temperature and then the solution is chilled to a sufficiently low temperature to effect precipitation of the wax which is subsequently removed by filtration, settling, or centrifuging. It is known that various materials, generally referred to as wax separation aids or wax crystallization regulators, when incorporated with the oil during the dewaxing process, aid materially in the separation of the wax from the oil.

In such a conventional process for separating wax from a waxy oil, the oil to be treated is admixed with a wax separation aid and with a selective solvent which shows a preferential solubility for oil over wax at the dewaxing temperature, such as propane or a normally liquid solvent or solvent mixture, such as toluene-acetone, pentane, benzene-methyl ethyl ketone, methyl isobutyl ketone, or other dewaxing solvents known in the industry. The resulting solution, is then chilled to a sufficiently low temperature to effect precipitation of the wax which is subsequently removed by filtration, settling, centrifuging, or the like. The concentration of the wax separation aid based on the oil to be treated is often within the range of from .01 to 5 weight percent, although concentrations outside this range can be employed, depending primarily on the dewaxing aid and the specific oil treated, and also on the specific process conditions employed.

Oil dewaxing processes of the type above-described are conducted under conditions dependent to a large extent on the selective solvent employed. In propane dewaxing, the propane-oil mixture is often cooled to a temperature within the limits of −40° F. to −60° F. For example, when dewaxing a lubricating oil such conditions provide for reduction of the pour point from about 75° F. or higher to about 0° F. or lower. When employing a normally liquid hydrocarbon solvent, the solvent-oil admixture is generally cooled to a temperature 30 to 50° F. below the desired pour point of the oil, under which conditions the required amount of dewaxing is generally obtained. When employing a ketone or ketone-containing solvent, the solvent-oil admixture is generally cooled to a temperature approximating the desired pour point of the oil, under which conditions the required amount of dewaxing is generally obtained. In any such solvent dewaxing process, the separation aid employed to promote dewaxing in precipitated with the wax.

The crystal regulators appear to influence the growth of the paraffin wax crystals in such a manner that crystal aggregates are formed, which on filtration produce a more or less porous cake, easily permeable to oil. It is thus of economic advantage to provide crystal growth regulators which will allow the most rapid filtration of oil for wax removal.

It is an object of this invention to provide a new wax crystal modifier. It is another object of this invention to provide an improved process for dewaxing of mineral oils. It is a further object of this invention to reduce the filtration time of oils in a dewaxing process.

These and other objects are achieved by the process of our invention as set forth in this specification and the appended claims.

According to the invention, a hydrogenated butadiene-styrene random copolymer is used as a wax crystal modifier in a dewaxing process.

Copolymers suitable for use in the process of our invention have a butadiene to styrene weight ratio of from about 9/1 to about 1/9, preferably from about 9/1 to about 1/1. These copolymers can be made in any manner known to the industry, such as by emulsion polymerization or by solution polymerization with known organometal initiators. For example, the method set forth in U.S. Patent No. 2,975,160 to Zelinski is a suitable method for making a random butadiene-styrene copolymer suitable for use in our invention.

After the copolymer has been made, it is subjected to a hydrogenation treatment by any known means. Contacting the copolymer with hydrogen in the presence of a conventional nickel-kieselguhr catalyst or an aluminum alkylnickel stearate catalyst is satisfactory.

The molecular weight of the hydrogenated copolymer should be in the range of from 10,000 to 200,000 as calculated from inherent viscosity measurements. After hydrogenation treatment, the unsaturation should be from 0 to about 20 weight per cent of the theoretical ethylenic unsaturation (C=C), preferably below about 10 weight percent C=C.

When used in the process of separating wax from mineral oils, the hydrogenated copolymer is added to the oil in an amount from about 0.01 to about 5 weight percent of the oil. The copolymer, solvent and the oil are mixed at an elevated temperature and stirred to form a homogeneous solution. The temperature is then reduced until the wax and copolymer crystallize from the solution.

When using propane, the mixture is cooled to a temperature of about −40° F. to about −60° F. When using a normally liquid hydrocarbon solvent, such as pentane, the solvent-oil mixture is cooled to a temperature 30 to 50° F. below the desired pour point of the oil. A pour point of around 0° F, or lower is generally suitable.

A commonly used wax crystal modifier of the prior art is a commercially available condensation product of a chlorinated paraffin wax and naphthalene diluted with a neutral oil. The hydrogenated butadiene-styrene random copolymer of our invention is essentially as effective at lower concentration, and is considerably cheaper than the current commercial modifiers.

Example I

A butadiene-styrene random copolymer was prepared using the following recipe and conditions:

|  | Parts by weight |
|---|---|
| Butadiene | 80 |
| Styrene | 20 |
| n-Hexane | 800 |
| Tetrahydrofuran | 1.5 |
| n-Butyllithium | [1]0.088 |
| Initiation temp., °F. | 140 |
| Initiation pressure, p.s.i.g. | 25 |

[1] Total; 0.034 p.h.m. consumed in scavenging.

Essentially quantitative conversion was obtained in 85 minutes, at which time the temperature was 183° F.

At that time, hydrogenation of the copolymer was initiated by introducing 0.37 p.h.m. (parts by weight per 100 parts of monomers) of nickel stearate and 0.47 p.h.m. of triisobutylaluminum, and the pressure was increased to 200 p.s.i.g. by hydrogen addition. This pressure was maintained for an additional 155 minutes, during which the temperature was increased gradually to 290° F. during 115 minutes and held at that temperature for 40 additional minutes. At that time, the unsaturation was reduced to 3.5 weight percent of the theoretical C=C*. The hydrogenated copolymer was short-stopped with isopropyl alcohol, stabilized by the addition of 0.5 p.h.m. of Cyanox SS (2,2-methylene bis(4-methyl-6-tert-butylphenol)), steam stripped, and extruder dried. The copolymer had a Mooney viscosity (ML–4) of 75 (ASTM D 1646–63, 212° F.).

The hydrogenation catalyst used in this example was prepared by weighing the nickel stearate and a small amount of n-hexane into a bomb, evacuating, pressuring to about 5 p.s.i.g. with nitrogen, pressuring the triisobutylaluminum into the bomb, mixing, and pressuring the mixture into the reactor.

Example II

The copolymer produced in Example I was tested as a wax crystal modifier in a phenol-extracted waxy 50 stock which had been prepared by propane extraction of a vacuum reduced Mid-Continent crude oil. This stock has a viscosity in the range of an SAE 50 motor oil, and was chosen for this example because it is one of the most difficult viscosity range oils to dewax successfully. One hundred parts of the oil was heated to about 200° F., and 0.038 or 0.075 part of the hydrogenated butadiene-styrene random copolymer of Example I was stirred into the oil. 310 parts of pentane was then stirred in. The mixture was cooled to 0° F. and filtered through a Whatman No. 1 filter paper under 10 inches of mercury pressure, and the amount of filtrate collected in 100 seconds was measured. Results are shown in table compared with those without modifier and with the commercial modifier:

TABLE

| Modifier Used | None | Chlorinated paraffin wax-naphthalene | Hydrogenated polymer | |
|---|---|---|---|---|
| Amount of modifier, wt. percent | 0 | 0.1 | 0.038 | 0.075 |
| Filtrate collected, grams | 4–6 | 16.6–22.1 | 11.1 | 20 |

From these data, it is seen that use of the hydrogenated copolymer of our invention gives a filtration rate equivalent to that obtained with the chlorinated paraffin wax-naphthalene modifier when used in only 75 percent of the quantity of the commercial modifier.

Reasonable modification and variation are possible within the scope of the foregoing disclosure and the appended claims to our invention, the essence of which is that a hydrogenated butadiene-styrene random copolymer is used as a wax crystal modifier in a dewaxing process.

We claim:
1. Process for dewaxing mineral oils comprising mixing a wax containing oil with a solvent and a hydrogenated butadiene-styrene random copolymer, and chilling the resultant mixture whereby wax is precipitated.
2. Process of claim 1 wherein said copolymer is present in an amount from about 0.01 to about 5 percent by weight of said oil.
3. Process of claim 1 wherein said precipitated wax is separated from said oil by filtration.
4. Process of claim 1 wherein said copolymer contains 90 to 10 parts by weight of butadiene and 10 to 90 parts of styrene.
5. Process of claim 4 wherein said copolymer contains from about 0 weight percent to about 20 weight percent of theoretical ethylenic unsaturation.
6. Process of claim 1 wherein said oil is a phenol extracted waxy stock prepared by propane extraction of vacuum reduced crude oil.
7. Process of claim 1 wherein said mixing occurs at about 200° F., and the resultant mixture is chilled to about 0° F. to effect precipitation of said wax.
8. Process of claim 1 wherein said copolymer has a molecular weight from about 10,000 to about 200,000.
9. Process of claim 1 wherein said copolymer is a solution polymerized random copolymer containing about 80 parts of butadiene and about 20 parts of styrene, and is hydrogenated in the presence of nickel stearate and triisobutylaluminum whereby the copolymer contains about 3.5 weight percent of the theoretical ethylenic unsaturation.

References Cited
UNITED STATES PATENTS

| 2,615,004 | 10/1952 | Jasper et al. | 252—59 |
| 2,658,872 | 11/1953 | Hollyday et al. | 252—59 |
| 2,686,759 | 8/1954 | Giammaria | 252—59 |
| 2,786,032 | 3/1957 | Hollyday et al. | 252—59 |
| 3,239,445 | 3/1966 | Leonard et al. | 208—33 |

HERBERT LEVINE, *Primary Examiner.*

U.S. Cl. X.R.

208—36; 252—431; 260—85.1

*Iodine monochloride method based on Kolthoff et al., J. Polymer Science 3, 66–84 (1948).